United States Patent [19]

Ogura et al.

[11] 4,223,245
[45] Sep. 16, 1980

[54] MAGNETRON DEVICE EXHIBITING REDUCED MICROWAVE LEAKAGE

[75] Inventors: Koichi Ogura, Yokohama; Tokuju Koinuma, Kawasaki, both of Japan

[73] Assignee: Tokyo Shibaura Electric Co., Ltd., Kawasaki, Japan

[21] Appl. No.: 871,743

[22] Filed: Jan. 23, 1978

[30] Foreign Application Priority Data

Jan. 21, 1977 [JP] Japan .................................. 52/5478

[51] Int. Cl.² .............................................. H01J 25/50
[52] U.S. Cl. ........................... 315/39.51; 219/10.55 B; 313/239; 315/101; 315/85
[58] Field of Search ................ 315/39.51, 39.75, 85, 315/94, 101, 102, 103, 105; 219/10.55 B, 10.55 D

[56] References Cited

U.S. PATENT DOCUMENTS

| | | | |
|---|---|---|---|
| 3,611,027 | 10/1971 | Koinuma et al. | 315/101 |
| 3,651,371 | 3/1972 | Tingley | 315/102 |
| 3,697,804 | 10/1972 | Anderson et al. | 315/85 |
| 3,922,612 | 11/1975 | Tashiro | 315/85 |
| 3,924,196 | 12/1975 | Takahashi et al. | 315/39.51 |
| 4,104,561 | 8/1978 | Iwata | 315/85 |
| 4,156,829 | 5/1979 | Harada | 315/39.51 |

Primary Examiner—Saxfield Chatmon, Jr.
Attorney, Agent, or Firm—Oblon, Fisher, Spivak, McClelland & Maier

[57] ABSTRACT

In a magnetron device, a shield box is disposed covering a cathode stem and energizing power is supplied from the outside of the shield box to cathode lead terminals in the shield box.

An energizing power supplying means comprises a transformer having a primary coil and a secondary coil which are both wound around a magnetic core and connect inductively the inner section of the shield box with the outer section. Thus high frequency noise which is a part of high frequency energy oscillated in anode resonant cavities and transmitted into the shield box through the cathode lead terminals is perfectly confined in the box. Therefore high frequency noise leaking out from the magnetron device toward a commercial power source is significantly reduced.

5 Claims, 8 Drawing Figures

MAGNETRON DEVICE EXHIBITING REDUCED MICROWAVE LEAKAGE

BACKGROUND OF THE INVENTION

1. Field of The Invention

This invention relates to a magnetron device and more particularly to construction thereof wherein energizing power is supplied through a shield box while preventing any undesired high frequency noise of the magnetron from leaking out.

BRIEF DESCRIPTION OF THE PRIOR ART

It is well known that cathode heating power or high voltage power supplied between a cathode and an anode of a magnetron is usually fed by means of lead wires passing through a shield box and a part of high frequency energy oscillated at anode resonant cavities of the magnetron is liable to leak out through these lead wires. This undesired radiation of the high frequency noise interferes with other electronic equipment. Particularly, because the cathode heating current must be more than 10 amperes, the cathode lead wire should be thick. Therefore it is difficult to determine capacitances or inductances of filter circuit elements so as to conpletely prevent the leakage of the high frequency energy. A requirement of suppressing entirely such undesired radiation has been increasingly raised.

SUMMARY OF THE INVENTION

Accordingly an object of the present invention is to provide a magnetron device which is capable of suppressing leakage of high frequency noise from a shield box covering a cathode stem.

Another object of the present invention is to provide a magnetron device in which energizing power is effectively fed from the outside of the shield box to cathode lead terminals in the shield box and the leakage of the frequency noise toward the commercial power source through the energizing power supplying means is remarkably reduced.

Still another object of the present invention is to provide a magnetron device which improves the efficiency of a transformer constituting an energizing power supplying means and can be made small.

A magnetron device according to the present invention comprises a cylindrical anode including a plurality of anode vanes therein, a cathode located on the central axis of the anode, a cathode stem supporting the cathode and having cathode lead terminals, a magnet disposed so as to generate a magnetic field substantially parallel to the axis in an interaction space defined between the cathode and the vanes, a high frequency shield box covering the cathode stem and suppressing high frequency noise leaking out through the cathode lead terminals, and an energizing power supplying means to supply energizing power from a commercial power source to the cathode lead terminals, wherein the energizing power supplying means comprises a transformer. The primary coil and the secondary coil of the transformer are inductively connected with each other at the outside and the inside of the shield box respectively. Thus any high frequency noise cannot pass through the energizing power supplying means and is surely confined in the shield box. Accordingly noise leaking from the magnetron toward the power source is reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
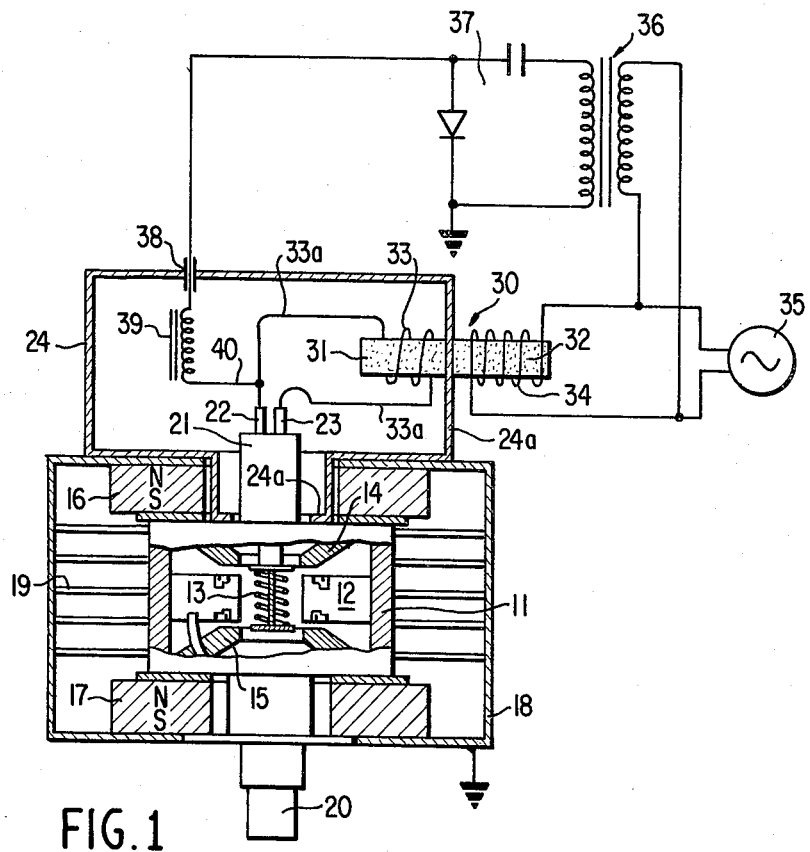
FIG. 1 is a cross-section showing the essential part of one embodiment of the present invention, where the electric circuit is represented by a connecting diagram.

Referring now to the drawings, wherein like reference numerals designate identical or corresponding parts throughout the several views, and more particularly to FIG. 1 thereof, a magnetron shown in FIG. 1 has the following construction. Inside a cylindrical anode 11, a plurality of anode vanes 12 are fixed thereto and a plurality of resonant cavities are defined between adjacent vanes. On the central axis of the anode 11 is disposed a cathode 13. To pole pieces 14, 15 are connected permanent magnets 16, 17 which generate a magnet field substantially parallel to the axis in an interaction space defined between the cathode and the vanes. These magnets 16, 17 are magnetically connected together by means of a magnetic yoke 18. To the outer periphery of the anode 11 is fixed a radiator 19 and is protrusively provided an output antenna 20. The cathode 13 is supported by a cathode stem 21, which has two cathode lead terminals 22, 23. Around the cathode stem 21 is provided a shield box 24 which is made of non-magnetic conductive material and isolates the inside of the box 24 from the outside for high frequency. An open cylindrical portion 24a provided at the bottom of the box 24 is electrically connected to the end of the anode 11. If necessary, a plurality of ventilators through which high frequency waves cannot pass may be provided. Through the wall 24a of the shield box 24 are located and inductively connected two magnetic cores 31, 32 at the inside and the outside of the box respectively. Both magnetic cores 31, 32 constitute a core of a transformer 30. Around the inner core 31 is wound a secondary coil 31 which is connected to the cathode lead terminals 22, 23 through lead wires 33a. Around the outer core 32 is wound a primary coil 34 which is connected to a commercial power source 35. These constitute a means for supplying energizing power to the cathode. The positive pole of the high voltage source supplying high voltage between the cathode and the anode and composed of a high voltage transformer 36 and a rectifying circuit 37 is connected so as to be equipotential to the anode and grounded. On the other hand the negative pole is connected to the cathode lead terminal 22 by a through-type capacitor 38 provided in the wall of the shield box and an inductor 39 located in the box.

In the magnetron device mentioned above, a cathode heating power is supplied in the box by means of the energizing power supplying means including the transformer inductively connected to the power source through the wall of the shield box. Meanwhile, though the inside of the box is filled with high frequency noises of about 100 KHz to 10 GHz when the magnetron is operating, the noise is not transmitted to the outside of the box because the box is electrically closed up. As the current in the lead wire 40 is less than several hundred milliamperes, the inductance of the inductor may be sufficiently heightened and the through-type capacitor may have a large capacitance. Therefore any high frequency noise leaking through the lead wire 40 is sufficiently intercepted by the filter circuit elements including the inductor 39 and the capacitor 38. A high frequency absorber may be connected to the lead wire instead of the inductor. In the magnetron device of this embodiment, as mentioned above, the cathode heating power is supplied by not using any lead wires passing through the wall of the shield box, so that any undesired high frequency noise leaking out from the shield box through the energizing power supplying means is perfectly suppressed.

Figure 2:
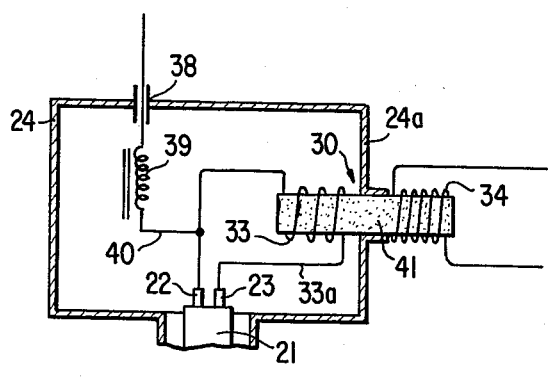
FIG. 2 is a cross-section showing the essential part of another embodiment of the present invention.

FIG. 2 shows another embodiment of the invention, in which a highly electro-conductive magnetic core 41 of a transformer 30 in an energizing power supplying means passes through a hole bored in a wall 24a of a shield box. The juncture of the wall 24 and the core 41 is thoroughly sealed in order that no high frequency energy can leak out. In this embodiment, a single core can be used, so that a primary coil 34 and a secondary coil 33 are inductively connected to each other. Leakage of high frequency noise to the outside of the shield box is therefore more effectively prevented.

Figure 3:
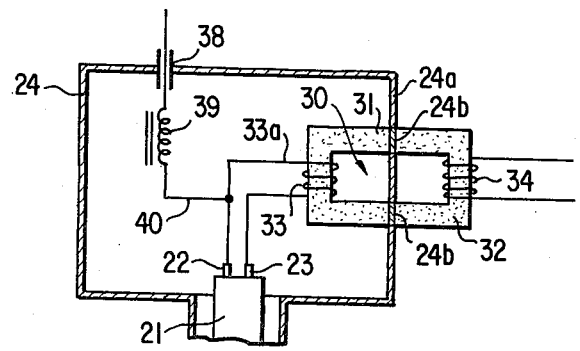
FIGS. 3 and 4 are cross-sections showing the essential parts of still another embodiments of the present invention.

FIG. 3 shows still another embodiment of the invention, in which two U-shaped magnetic cores 31, 32 are disposed opposite to each other so as to form a closed magnetic circuit. In this case, as most portions of the shield box 24 are made of non-magnetic material and only the remainder portions 24b through which the cores 31, 32 are junctioned opposite to each other is made of magnetic material, magnetic loss of the transformer is remarkably reduced. In this embodiment energizing power can be effectively supplied and any leakage of high frequency noise may be surely suppressed.

Figure 4:
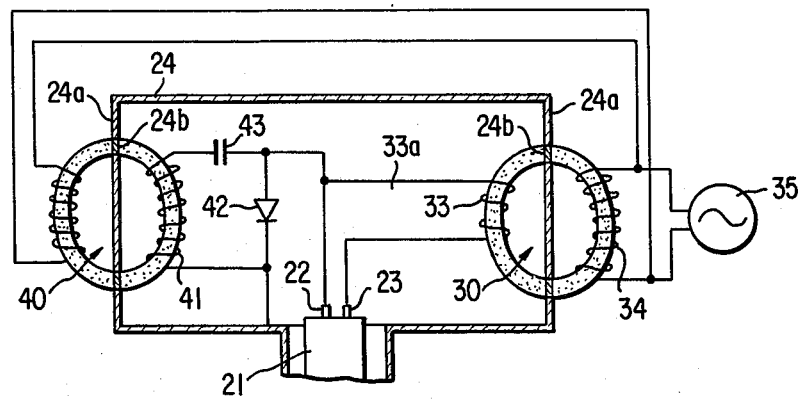

FIG. 4 shows still another embodiment of this invention in which high voltage power supplied between a cathode and an anode is fed into a shield box by a high voltage transformer 40 inductively connected through the wall 24a of a shield box. Behind the secondary coil 41 inside the box is provided a rectifying circuit comprising a high voltage rectifier 42 and a capacitor 43. In this magnetron device, high voltage power is also fed by a transformer. The primary coil and the secondary coil of the transformer are inductively connected with each other at the outside and the inside of the shield box respectively, so that any leakage of undesired high frequency noise can be more effectively prevented. Moreover as the high voltage rectifier is located inside the shield box, the magnetron may be easily treated.

Figure 5A:
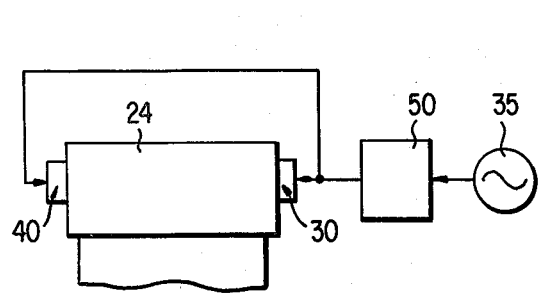
FIGS. 5a and 5b are block diagrams showing still another embodiments of the present invention.

FIG. 5a shows still another embodiment of the invention in which a frequency converter 50 raising the frequency of the commercial power source up to for example score of KHz is connected between the commercial power source 35 and the transformers 30, 40 of the energizing power supplying means same as the construction shown in FIG. 4. In this embodiment, the transformer inductively connected through the wall of the shield box operates at sufficiently higher frequency than the commercial power source frequency (50 or 60 Hz), and consequently has a high efficiency and can be made small and light weight. Therefore the magnetron device may be constructed without increasing the volume of the box very much. The converter 50 may be connected to only one of the transformers 30, 40.

Figure 5B:
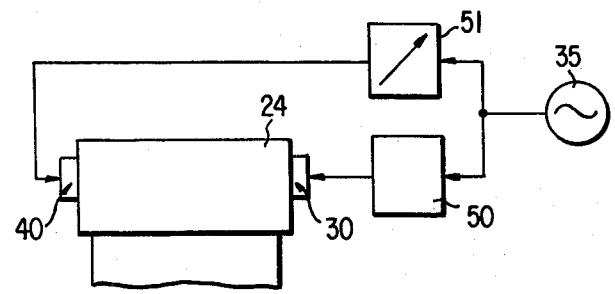

In the embodiment shown in FIG. 5b, a transformer 30 operates at a predetermined high frequency by connecting a converter 50 converting the commercial source frequency into a higher frequency to the transformer 30 of the energizing power supplying means the same as the construction shown in FIG. 4. On the other hand, to the transformer 40 supplying high voltage is connected a variable frequency converter 51 which converts the commercial source frequency into any higher frequency. Thus the transformers 30 and 40 may operate at a high frequency region and be made small. As the frequency of the variable frequency converter changes, the impedance of the secondary circuit of the transformer 40 also changes. In consequence a high voltage supplied between the cathode and the anode may be finely controlled and the output power of the magnetron may be variable.

Figure 6:
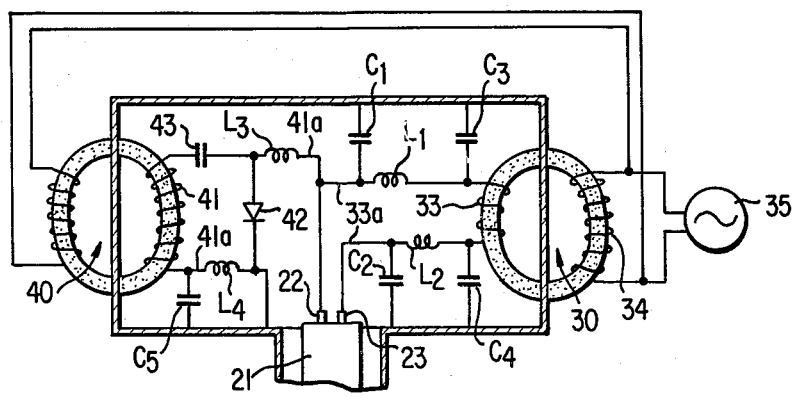
FIG. 6 is an outline of still another embodiment of the present invention.

FIG. 6 shows another embodiment of this invention in which lead wires 33a, 41a connecting the secondary coil of the transformer to the cathode lead terminals are disposed inside a shield box 24. To the lead wires 33a, 41a are connected a plurality of filter circuit elements including inductors $L_1$, $L_2$, $L_3$, $L_4$ and capacitors $C_1$, $C_2$, $C_3$, $C_4$, $C_5$. These elements form a band pass filter or a low pass filter which admits only a given power source frequency band (50 or 60 Hz or an output frequency of the frequency converter) to the transformer and intercept any other high frequency noise. Instead of the inductors a high frequency absorber may be used. As the absorber, a ferrite bead having a through-hole through which lead wires pass is preferable. In this magnetron, only the given energizing power passes through by the inductive connection between the inside and outside of the shield box and other high frequency noise is surely intercepted.

Figure 7:
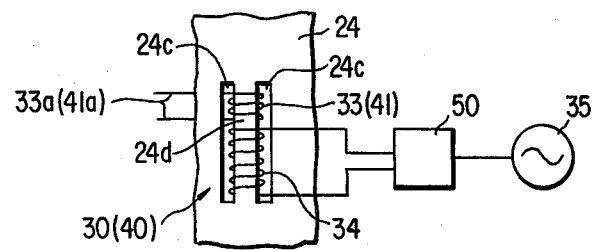
FIG. 7 is an outline showing the essential part of further embodiment of the present invention.

A further embodiment of the invention shown in FIG. 7 comprises a shield box 24 of magnetic material. Two slits 24c are formed in the wall of the box 24. Around the core portion 24d are wound a primary coil 34 and secondary coils 33, 41 which constitute transformer 30 or 40. The width of the slits 24c is determined in order that no high frequency noise passes therethrough. As this magnetron device utilizes the wall of the shield box itself as the magnetic core of the transformer, its construction becomes more simple. Especially in this embodiment it is more favorable that the transformer should be operated at a higher frequency than the commercial power source frequency.

As the magnetic core of the transformer, a ferrite core may be preferably utilized. Because the ferrite core is light weight and has high absorption property for high frequency noise, it is usable to attenuate the high frequency noise.

What is claimed as new and desired to be secured by Letters Patent of the United States is:

1. A magnetron device comprising,
   a cylindrical anode including a plurality of anode vanes therein;

a cathode disposed on the axis of the cylindrical anode;

a cathode stem holding the cathode and having cathode lead terminals;

a magnet disposed so as to provide a magnetic field substantially parallel to the axis in an interaction space formed between the cathode and the vanes;

a high frequency shield box covering the cathode stem and confining therein high frequency noise leaking out through the cathode lead terminals; and an energizing power supplying means for supplying energizing power from a commercial power source to the cathode lead terminals, wherein the energizing power supplying means comprises a cathode heating circuit including a transformer having a core and primary and secondary coils disposed on said core, the primary and the secondary coils of the transformer being disposed at the outside and the inside of the shield box respectively and inductively coupled with each other through the shield box, said energizing power supplying means further comprising a high voltage circuit supplying high voltage between the cathode and the anode, said high voltage circuit comprising a transformer capable of being coupled to a commercial power source, wherein the transformer of said high voltage circuit is disposed outside said shield box, and a filter circuit coupling said high voltage circuit transformer to said cathode and said anode, said filter circuit comprising a feedthrough capacitor mounted in a wall of said shield box and an inductor connected in series with said feedthrough capacitor in said shield box.

2. A magnetron device according to claim 1, further comprising:

a frequency converter coupled to the primary coil of said cathode heating circuit transformer for generating electric current converted into high frequency current having a frequency higher than that of the commercial power source.

3. A magnetron device according to claim 1, wherein at least one portion of said shield box comprises a magnetic material, said at least one magnetic portion is disposed between said primary and secondary coils for magnetically coupling said primary and secondary coils, whereby said shield box not only shields high frequency leakage but also couples said coil to said secondary coil.

4. A magnetron device according to claim 6, wherein the cathode heater circuit transformer comprises an outer magnetic core portion on which the primary coil is wound and an inner magnetic core portion on which the secondary coil is wound, whereby these core portions and said magnetic portion of said shield box form a closed magnetic circuit through the shield box.

5. A magnetron according to claim 1, further comprising:

said core of said cathode heating circuit transformer comprising a single magnetic core piercing the shield box, the primary coil and secondary coils of said cathode heating circuit transformer disposed on an outer core portion and an inner core portion, respectively, of said single magnetic core.

* * * * *